US012624274B2

(12) United States Patent
Alanqari et al.

(10) Patent No.: US 12,624,274 B2
(45) Date of Patent: May 12, 2026

(54) LOST CIRCULATION COMPOSITIONS COMPRISING RED MUD

(71) Applicant: SAUDI ARABIAN OIL COMPANY, Dhahran (SA)

(72) Inventors: Khawlah Alanqari, Dhahran (SA); Abdullah Al-Yami, Dhahran (SA); Mohammad Alharthi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/799,015

(22) Filed: Aug. 9, 2024

(65) Prior Publication Data

US 2026/0042952 A1 Feb. 12, 2026

(51) Int. Cl.

| | |
|---|---|
| ***E21B 21/00*** | (2006.01) |
| ***C04B 12/00*** | (2006.01) |
| ***C09K 8/504*** | (2006.01) |

(52) U.S. Cl.

CPC .......... *C09K 8/5045* (2013.01); *C04B 12/005* (2013.01); *E21B 21/003* (2013.01)

(58) Field of Classification Search

None

See application file for complete search history.

(56) References Cited

U.S. PATENT DOCUMENTS

| | | | | |
|---|---|---|---|---|
| 3,776,717 A * | 12/1973 | Kapolyi | C21B 13/006 75/433 |
| 3,985,567 A * | 10/1976 | Iwu | C04B 33/1322 501/141 |
| 4,133,866 A * | 1/1979 | Lakatos | C22B 26/10 423/208 |
| 7,794,537 B2 | 9/2010 | Barlet-Gouedard et al. | |
| 7,846,250 B2 | 12/2010 | Barlet-Gouedard et al. | |
| 9,222,010 B2 | 12/2015 | Porcherie et al. | |
| 9,321,687 B2 | 4/2016 | Gupta et al. | |
| 9,394,202 B2 | 7/2016 | Porcherie et al. | |
| 9,890,082 B2 | 2/2018 | Dubey et al. | |
| 10,017,418 B2 | 7/2018 | Thomas et al. | |
| 10,112,869 B2 | 10/2018 | Agapiou | |
| 10,113,389 B2 | 10/2018 | Pandey et al. | |

(Continued)

FOREIGN PATENT DOCUMENTS

| | | |
|---|---|---|
| CN | 110563365 A | 12/2019 |
| CN | 112979230 A | 6/2021 |

(Continued)

OTHER PUBLICATIONS

Umme Zakira, et al., Development of high-strength geopolymers from red mud and blast furnace slag, Journal of Cleaner Production, vol. 383, 2023.

*Primary Examiner* — Andrew Sue-Ako

(74) *Attorney, Agent, or Firm* — Vorys, Sater, Seymour and Pease LLP

(57) ABSTRACT

The invention is directed to lost circulation material (LCM) compositions capable of forming geopolymers, said LCM compositions comprising red mud, a silica source, a developed alkaline activator (DAA), and an aqueous source, and methods and systems related thereto for treating a lost circulation zone within a subterranean formation using the LCM compositions which form said geopolymers therein so as to at least partially prevent lost circulation.

17 Claims, 2 Drawing Sheets

(56) References Cited

U.S. PATENT DOCUMENTS

| | | | | |
|---|---|---|---|---|
| 10,407,343 | B2 | 9/2019 | Nie et al. | |
| 10,920,121 | B1 * | 2/2021 | Alanqari | E21B 21/003 |
| 11,162,015 | B2 | 11/2021 | Pisklak et al. | |
| 11,242,479 | B2 | 2/2022 | Pisklak et al. | |
| 11,472,741 | B2 | 10/2022 | Sampson et al. | |
| 2007/0125272 | A1 | 6/2007 | Johnson | |
| 2017/0306211 | A1 * | 10/2017 | Pisklak | E21B 33/14 |
| 2017/0320751 | A1 * | 11/2017 | Amiran | C01B 32/40 |
| 2017/0369762 | A1 * | 12/2017 | Martinez | C04B 24/003 |
| 2023/0202923 | A1 | 6/2023 | Lee et al. | |

FOREIGN PATENT DOCUMENTS

| | | | |
|---|---|---|---|
| EP | 3880625 | A1 | 9/2021 |
| EP | 4015480 | A2 | 6/2022 |
| KR | 20210122500 | A | 10/2021 |
| WO | 2022226417 | A2 | 10/2022 |

* cited by examiner

LOST CIRCULATION COMPOSITIONS COMPRISING RED MUD

FIELD OF THE DISCLOSURE

The present disclosure relates generally to geopolymer lost circulation compositions comprising red mud and methods and systems related thereto.

BACKGROUND OF THE DISCLOSURE

Hydrocarbon producing wells are typically formed by drilling a wellbore into a subterranean formation. A drilling fluid is circulated through a drill bit within the wellbore as the wellbore is being drilled. The drilling fluid is produced back to the surface of the wellbore with drilling cuttings. The drilling fluid maintains a specific, balanced hydrostatic pressure within the wellbore, permitting all or most of the drilling fluid to be produced back to the surface. However, the hydrostatic pressure of the drilling fluid may be compromised if the drill bit encounters certain unfavorable subterranean zones, such as low-pressure zones caused by natural fissures, fractures, vugs, or caverns into which the drilling fluid may become lost into the formation, termed "lost circulation zones" or "fluid loss zones."

After a wellbore is drilled, a cement column may be placed around a casing (or liner string) in the wellbore. In some instances, the cement column is formed by pumping a cement slurry through the bottom of the casing and out through an annulus between the outer casing wall and the formation face of the wellbore. The cement slurry then cures in the annular space, thereby forming a sheath of hardened cement that, among other functions, supports and positions the casing in the wellbore and bonds the exterior surface of the casing to the subterranean formation. However, like drilling fluid, the cement slurry may be lost to lost circulation zones, thereby compromising the integrity of the cement column.

Stimulation of subterranean formations may be performed using fracturing operations using a fracturing fluid to obtain hydrocarbons. During stimulation, the fracturing fluid may become lost to lost circulation zones, as well. In such circumstances, the fracturing operation may be compromised.

The consequences of these types of lost circulation may be economically and environmentally devastating, ranging from minor volume loss of treatment fluids (e.g., drilling fluids, cement slurries, fracturing fluids, and the like), to delayed drilling and production operations, to an underground well blow-out, and the like. Therefore, the occurrence of fluid loss during hydrocarbon well operations typically require immediate remedial steps. Remediation often involves introducing a composition into the wellbore to seal unfavorable subterranean zones and prevent leakoff of the treatment fluids within the formation to lost circulation zones. Such compositions are generally referred to as "lost circulation material (LCM)" compositions.

Some previously disclosed LCM compositions are toxic and thus may harm the environment. Due to environmental regulations, costly procedures often must be followed to dispose of the treatment fluids containing such LCM compositions, ensuring that they do not contact the marine environment and groundwater. Thus, it is desirable to use low environmental impact additives for fluid loss control.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, lost circulation material (LCM) methods comprise: providing a lost circulation material (LCM) composition comprising: a red mud; a silica source; a developed alkaline activator (DAA); and an aqueous source; placing the LCM composition in a lost circulation zone in a subterranean formation; and allowing the LCM composition to set to form a geopolymer in the lost circulation zone so as to at least partially prevent lost circulation.

According to an embodiment consistent with the present disclosure, LCM compositions comprise: a red mud comprising aluminum oxide and silicon dioxide; a silica source; a developed alkaline activator (DAA) comprising sodium hydroxide and sodium silicate; and an aqueous source.

According to an embodiment consistent with the present disclosure, LCM systems comprise: a tubular extending into a wellbore in a subterranean formation; and a pump fluidly coupled to the tubular, wherein the pump is capable of conveying a lost circulation material (LCM) composition into the wellbore via the tubular at a pressure sufficient for the LCM composition to penetrate a lost circulation zone of the subterranean formation, the LCM composition comprising: a red mud comprising aluminum oxide and silicon dioxide; a silica source; a developed alkaline activator (DAA); and an aqueous source.

Any combinations of the various embodiments and implementations disclosed herein may be used in a further embodiment, consistent with the disclosure. These and other aspects and features may be appreciated from the following description of certain embodiments presented herein in accordance with the disclosure and the accompanying drawings and claims.

DETAILED DESCRIPTION

Figure 1:
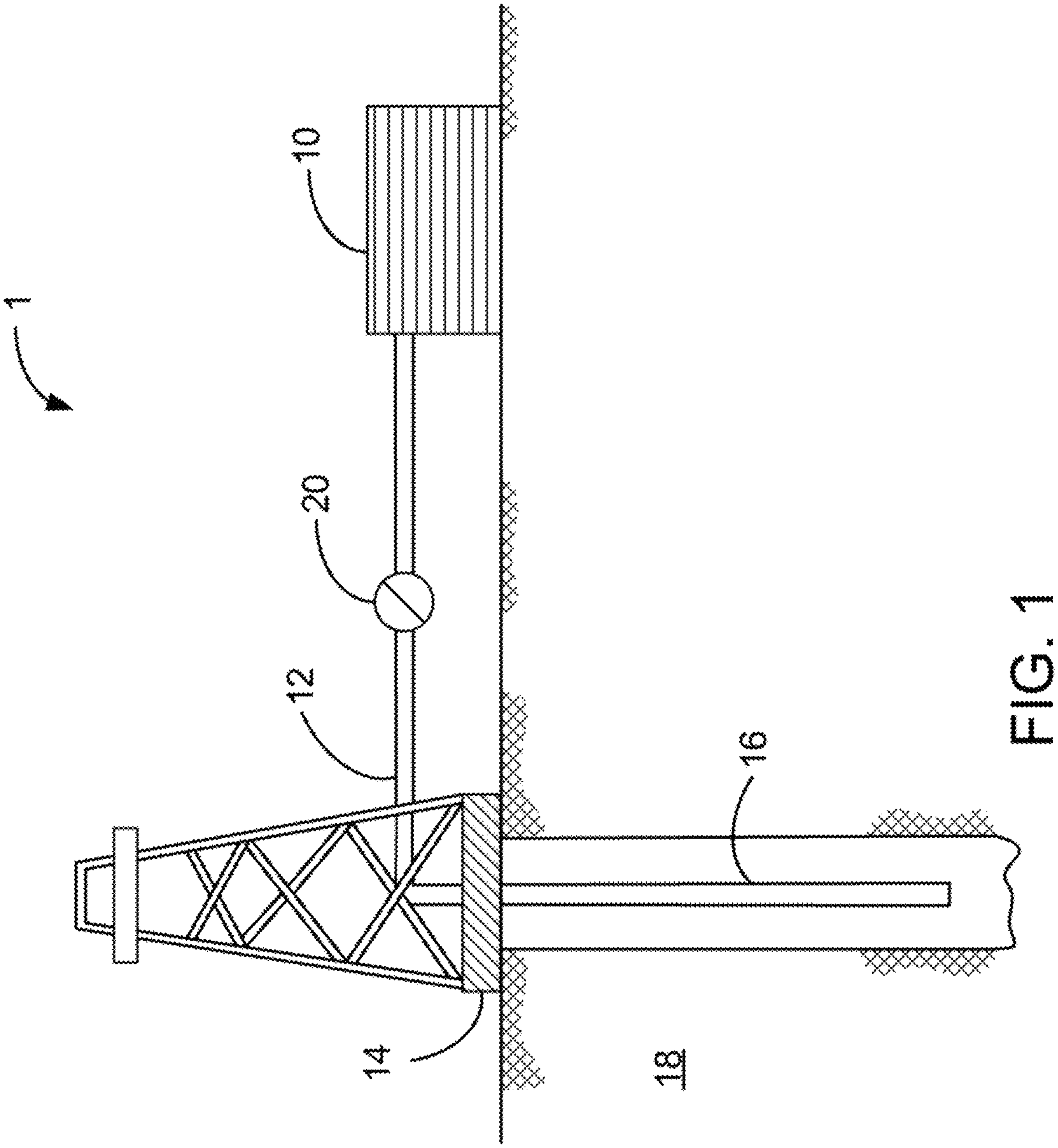
FIG. 1 depicts an embodiment of a system configured for delivering the LCM compositions of the embodiments described herein to a downhole location.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure relate to geopolymer lost circulation compositions comprising red mud and methods and systems related thereto. More specifically, the lost circulation compositions comprise red mud, a developed alkaline activator, a silica ($SiO_2$) source material, and an aqueous source.

As used herein, the term "red mud," and grammatical variants thereof, refers to an industrial waste (by-product) generated during the processing of bauxite into alumina using the Bayer process. The term "red mud" is also referred to in the industry as "bauxite refinery residue" or "bauxite residue."

Several tons (about 1-2 tons) of red mud are produced for every ton of alumina production, resulting in the production of about 175-180 million tons of red mud accumulated annually on a global scale. Red mud may be considered toxic due to chemical and biological effects of highly basic pH (e.g., about 10-12), electrical conductivity, and sodium and aluminum ion (i.e., $Na^+$ and $Al^{3+}$) concentrations. The large quantities produced worldwide require large useful lands for disposal and storage, but present one or the largest environmentally hazardous wastes. Accordingly, the present disclosure describes the use of red mud to form a geopolymer as a valuable and green lost circulation material (LCM) through the use of underlying chemical reactions, thereby transforming an otherwise toxic by-product into a sustainable material for fluid loss control.

Red mud is composed of a mixture of solid and metallic oxides primarily composed of aluminum oxide ($Al_2O_3$) and silicon dioxide ($SiO_2$), which may together be used as an aluminosilicate source for geopolymer preparation. As used herein, the term "geopolymer," and grammatical variants thereof, refer to inorganic materials that form covalently bonded, non-crystalline (amorphous) networks. Particularly, as described herein, the red mud geopolymers of the present disclosure are prepared from aluminosilicate materials to form binders or hard materials through a geopolymerization reaction without the requirement of any source of Ordinary Portland cement. The geopolymerization reaction proceeds quickly and involves a first dissolution of silicon and aluminum oxide species from the red mud aluminosilicate source materials under alkaline conductions, followed by a polycondensation reaction of mixed hydroxy ions to form a final gel structure as a 3D chain. The final gel structure comprises a tetrahedral assembly composed of silicate and aluminate linked via oxygen atoms. Chemical Structure 1 below shows the composition of the final gel structure:

Chemical Structure 1

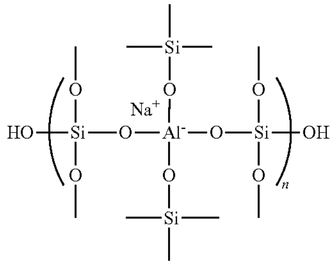

Wherein the reaction proceeds as: $Na_n[(—SiO_2)z-AlO_2]_n·yH_2O$, and n is the degree of polymerization, z may be an integer of 2, 3, 4, or higher depending on the amount of soluble silica present and involved in polymerization, and y may be adjusted based on other additives to improve workability and mixing.

The reaction methods are described below in greater detail.

LCM Compositions

As briefly described above, the LCM compositions of the present disclosure comprise red mud, a developed alkaline activator, a silica ($SiO_2$) source, and an aqueous source. In various embodiments, LCM composition comprise a red mud comprising aluminum oxide and silicon dioxide; a silica source; a developed alkaline activator (DAA) comprising sodium hydroxide and sodium silicate; and an aqueous source.

Red Mud: The red mud included in the LCM compositions of the present disclosure may comprise a mixture of solid and metallic oxides ($M_2O$), primarily of $SiO_2$ and $Al_2O_3$, as described above. In various instances, as described herein, iron(III) oxide ($Fe_2O_3$) may be dominant in red mud and trace or relatively small amounts of calcium oxide (CaO), magnesium oxide (MgO), and potassium oxide ($K_2O$) may additionally be present, among other chemistries.

The elemental composition of the red mud included in the LCM compositions, which may be measured using wavelength dispersive x-ray fluorescence (WDXRF) using a WDXRF spectrometer (see Examples below), may include sodium (Na) in an amount in the range of about 20 percent by weight (wt. %) to about 40 wt. %, encompassing any value and subrange in between, such as 20 wt. % to 30 wt. %, or 30 wt. % to 40 wt. %, or 30 wt. % to 35 wt. %, without limitation. Additionally, the red mud may comprise oxygen (O) in an amount in the range of about 30 wt. % to about 35 wt. %; iron (Fe) in an amount in the range of about 10 wt. % to about 13 wt. %; aluminum (Al) in the range of about 5 wt. % to about 7 wt. %; and silicon (Si) in an amount in the range of about 3 wt. % to about 4 wt. %, encompassing any value and subrange in between. Other elements that may be included in the red mud include trance amounts (i.e., less than 3.5 wt. %) of calcium (Ca), titanium (Ti), sulfur (S), fluorine (F), chlorine (Cl), strontium (Sr), zirconium (Zr), phosphorous (P), magnesium (Mg), and chromium (Cr).

The red mud included in the LCM compositions of the present disclosure, in one or more embodiments, may have a molar ratio of $SiO_2/Al_2O_3$ is in the range of about 2 to 6, encompassing any value and subrange in between, such as 2 to 3, or 3 to 4, or 4 to 5, or 5 to 6, or 2.5 to 3.5, or 3.5 to 4.5, or 4.5 to 5.5.

The red mud included in the LCM compositions of the present disclosure may be present in an amount in the range of about 10 wt. % to about 95 wt. % of the total weight of the LCM composition, encompassing any value and subrange therebetween, such as 10 wt. % to 20 wt. %, or 20 wt. % to 30 wt. %, or 30 wt. % to 40 wt. %, or 40 wt. % to 50 wt. %, or 50 wt. % to 60 wt. %, or 60 wt. % to 70 wt. %, or 70 wt. % to 80 wt. %, or 80 wt. % to 90 wt. %, or 90 wt. % to 95 wt. %, or 15 wt. % to 25 wt. %, or 25 wt. % to 35 wt. %, or 35 wt. % to 45 wt. %, or 45 wt. % to 55 wt. %, or 55 wt. % to or 65 wt. %, or 65 wt. % to 75 wt. %, or 75 wt. % to 85 wt. %, or 85 wt. % to 95 wt. %, or 10 wt. % to 30 wt. %, or 15 wt. % to 35 wt. %, or 20 wt. % to 40 wt. %, or 25 wt. % to 45 wt. %, or 30 wt. % to 50 wt. %, or 35 wt. % to 55 wt. %, or 40 wt. % to 60 wt. %, 45 wt. % to 65 wt. %, or 50 wt. % to 70 wt. %, or 55 wt. % to 75 wt. %, or 60 wt. % to 80 wt. %, or 65 wt. % to 85 wt. %, or 70 wt. % to 90 wt. %, or 75 wt. % to 95 wt. %, or 40 wt. % to 70 wt. %, or 45 wt. % to 75 wt. %, or 50 wt. % to 80 wt. %, or 55 wt.

% to 85 wt. %, or 60 wt. % to 90 wt. %, or 65 wt. % to 95 wt. %, or of the total weight of the LCM composition, without limitation. The red mud may be present in the LCM compositions of the present disclosure in an amount in the range of about 30 wt. % to about 90 wt. % of the total weight of the LCM composition, encompassing any value and subrange therebetween, such as 30 wt. % to 70 wt. %, or 35 wt. % to 45 wt. %.

The red mud included in the LCM compositions of the present disclosure may be present in an amount in the range of about 10 wt. % to about 70 wt. % of the total solids of the LCM composition (e.g., the total red mud solids, developed alkaline activator (DAA) solids, silica source solids, optional calcium source solids, and the like) in the LCM composition, encompassing any value and subrange in between, such as 10 wt. % to 20 wt. %, or 20 wt. % to 30 wt. %, or 30 wt. % to 40 wt. %, or 40 wt. % to 50 wt. %, or 50 wt. % to 60 wt. %, or 60 wt. % to 70 wt. %, or 10 wt. % to 60 wt. %, or 10 wt. % to 50 wt. %, or 10 wt. % to 40 wt. %, or 10 wt. % to 30 wt. %, or 20 wt. % to 70 wt. %, or 20 wt. % to 60 wt. %, or 20 wt. % to 50 wt. %, or 20 wt. % to 40 wt. %, or 25 wt. % to 65 wt. %, or 25 wt. % to 55 wt. %, or 25 wt. % to 45 wt. %, or 25 wt. % to 35 wt. %, or 30 wt. % to 70 wt. %, or 30 wt. % to 60 wt. %, or 30 wt. % to 50 wt. %, or 40 wt. % to 70 wt. %, or 40 wt. % to 60 wt. %, or 50 wt. % to 70 wt. %, of the solids in the LCM composition, without limitation. The red mud may be present in the LCM compositions of the present disclosure in an amount in the range of about 50 wt. % to about 70 wt. % of the total solids of the LCM composition.

In one or more embodiments, the red mud included in the LCM compositions may have an average particle size diameter of less than 50 micrometers (μm), such as in the range of about 2.5 μm to about 200 μm, encompassing any value and subrange in between, such as 2.5 μm to 10 μm, or 10 μm to 20 μm, or 20 μm to 30 μm, or 30 μm to 40 μm, or 40 μm to 50 μm, or 50 μm to 60 μm, or 60 μm to 70 μm, or 70 μm to 80 μm, or 80 μm to 90 μm, or 90 μm to 100 μm, or 100 μm to 110 μm, or 110 μm to 120 μm, or 120 μm to 130 μm, or 130 μm to 140 μm, or 140 μm to 150 μm, or 150 μm to 160 μm, or 5 μm to 25 μm, or 25 μm to 50 μm, or 50 μm to 75 μm, or 75 μm to 100 μm, or 100 μm to 125 μm, or 125 μm to 150 μm, or 150 μm to 200 μm, without limitation.

Developed Alkaline Activator (DAA): The developed alkaline activator (DAA) described herein comprises a sodium silicate ($(SiO_2)_n$:$Na_2O$) and sodium hydroxide (NaOH).

Commercial sodium silicate is formed from a mixture of silicon dioxide ($SiO_2$) and sodium hydroxide (NaOH). Soluble silicate comprises three components: water, alkali, and silicate. Silicates exist as polymeric forms in solution, wherein a tetrahedral silicon atom forms the fundamental block in the silicate solution. More particularly, the tetrahedral silicon may be in the form of a silicate monomer (see Chemical Structure 2 below) having tetrahedral silicon at the center of an oxygen-cornered, four-sided pyramid and wherein the formed sodium silicate may comprise various silicate monomers (see Chemical Structure 3 below), a sodium atom(s), or a hydrogen atom(s).

Chemical Structure 2

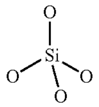

-continued

Chemical Structure 3

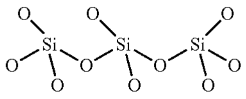

Commercial sodium silicate comprises a clear aqueous fluid with a basic pH in the range of 11-13, which is based on the $SiO_2/Na_2O$ molar ratio. As the molar ratio of $SiO_2/Na_2O$ decreases, alkalinity increases. At high pH, its dimer silicate structure dominates and at low pH, liquid silicate will gel through polymerization of the silicate species.

The DAA included within the LCM compositions of the present disclosure is available in various forms and in various molar ratios of $Na_2O/SiO_2$, such as in the range of about 0.2 to about 0.4, encompassing any value and subrange in between, such as 0.2 to 0.25, or 0.25 to 0.3, or 0.35 to 0.4, without limitation. In some specific instances, the molar ratio of $Na_2O/SiO_2$ is about 0.3 (e.g., 0.296). The selected DAA molar ratio of $Na_2O$ to $SiO_2$ may be advantageously varied to selectively control gelation time and deep gel penetration within a wellbore, for example.

NaOH is included as a component of the DAA to facilitate geopolymerization of the red mud by increasing alkalinity of the DAA. The NaOH may be prepared (i.e., to achieve the desired molarity, pH, and the like) using any of the following aqueous sources described herein below. The NaOH may have a molarity in the range of 6 to 16 in the DAA composition, encompassing any value and subrange in between, such as 6 to 7, or 7 to 8, or 8 to 9, or 9 to 10, or 10 to 11, or 11 to 12, or 12 to 13, or 13 to 14, or 14 to 15, or 15 to 16, or 7 to 9, or 8 to 10, or 9 to 11, or 10 to 12, or 11 to 13, or 12 to 14, or 13 to 15, or 14 to 16, without limitation. The pH of the NaOH may be in the range of about 12 to 13, encompassing any value and subrange in between, without limitation, to facilitate the geopolymerization reaction described herein.

In one or more aspects, the molar ratio of sodium silicate to NaOH in the DAA is in the range of about 1.5:1 to about 2.5:1, encompassing any value and subrange in between, such as 1.5:1 to 1.6:1, or 1.6:1 to 1.7:1, or 1.7:1 to 1.8:1, or 1.8:1 to 1.9:1, or 1.9:1 to 2.0:1, or 2.0:1 to 2.1:1, or 2.1:1 to 2.2:1, or 2.2:1 to 2.3:1, or 2.3:1 to 2.4:1, or 2.4:1 to 2.5:1, or 1.5:1 to 2.0:1, without limitation.

The DAA for use in the LCM compositions described herein may have a pH in the range of 11 to 13, encompassing any value and subrange in between, such as 11 to 12, or 12 to 13, without limitation. The pH of the DAA may be adjusted by adjustment of the pH of the NaOH included.

In one or more embodiments, the DAA ($(SiO_2)_n$:$Na_2O$/NaOH) may be present in the LCM compositions of the present disclosure, such that the molar ratio of the DAA to $Al_2O_3$ in the red mud is in the range of about 0.4 to about 1.0, encompassing any value and subrange in between, such as 0.4 to 0.5, or 0.5 to 0.6, or 0.6 to 0.7, or 0.7 to 0.8, or 0.8 to 0.9, or 0.9 to 1.0, or 0.4 to 0.8, or 0.6 to 1.0, without limitation.

In one or more embodiments, the LCM composition of the present disclosure may comprise about 30 wt. % to about 70 wt. % of the DAA solution, based on the total weight of the red mud. In one or more embodiments, the LCM composition of the present disclosure may comprise about 10 wt. % to about 70 wt. % of the DAA solution and the aqueous source, based on the total weight of the red mud.

Silica Source Material: The LCM compositions of the present disclosure may further comprise an additional silica source material (silica source) comprising silicon dioxide ($SiO_2$), which may be used to increase the strength of the geopolymerized LCM compositions. Moreover, the addition of the silica source may be used to influence setting time and curing strength of the LCM compositions in a subterranean formation downhole location. The silica source may be selected from silica fume, Portland cement, and any combination thereof. In one or more instances, the LCM may comprise a silica source in an amount in the range of about 0.1 wt. % to about 50 wt. % based on total weight of the red mud, encompassing any value and subrange in between, such as in the range of 0.1 wt. % to 20 wt. %, or 1 wt. % to 10 wt. %, or 25 wt. % to 50 wt. %, or 40 wt. % to 50 wt. %, without limitation.

Aqueous Source: The LCM compositions may comprise an aqueous source comprising deionized water, tap water, fresh water, salt water, natural brine, synthetic brine, municipal water, formation water, produced water, well water, filtered water, distilled water, sea water, purified contaminated water, and the like, and any combination thereof. In one or more instances, the aqueous source comprises one or more salts and/or other organic compounds dissolved or miscible with the aqueous source, which may beneficially control certain properties of the aqueous source and thus the geopolymerized LCM compositions. For example, and without being bound by theory, it is believed that an increase in such salts and/or organic compounds may increase the density of the aqueous source and, therefore, the geopolymerized LCM compositions. Suitable such salts and/or organic compounds may include, but are not limited to, alkali metal chlorides, hydroxides, or carboxylates and, more specifically, those including, but not limited to, sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, fluorides, and any combination thereof.

In one or more instances, the aqueous source may be included in the LCM compositions of the present disclosure in an amount in the range of about 10 wt. % to about 70 wt. % by total weight of the red mud, encompassing any value and subrange in between, such as 10 wt. % to 20 wt. %, or 10 wt. % to 30 wt. %, or 10 wt. % to 40 wt. %, or 10 wt. % to 60 wt. %, or 20 wt. % to 30 wt. %, or 20 wt. % to 40 wt. %, or 25 wt. % to 35 wt. %, without limitation. In some embodiments, the geo-polymer slurry may contain from 0 wt % to 40 wt. % of the aqueous source, based on the total weight of the red mud.

Calcium Source: The LCM compositions described herein may further comprise a calcium source, which may be used to enhance microstructure and mechanical properties of the geopolymerized LCM compositions. Suitable examples of calcium sources may include, but are not limited to, calcium oxide (CaO) sources, calcium salt sources, the like, or any combination thereof. Calcium salt sources may include, for example, calcium chloride ($CaCl_2$), the like, or any combination thereof. CaO sources may include lime, the like, and any combination thereof. Calcium sources may be included in the LCM compositions of the present disclosure in an amount in the range of about 2 wt. % to about 8 wt. % based on total weight of the red mud, encompassing any value and subrange in between, such as 2 wt. % to 3 wt. %, or 3 wt. % to 4 wt. %, to 4 wt. % to 5 wt. %, or 5 wt. % to 6 wt. %, or 6 wt. % to 7 wt. %, or 7 wt. % to 8 wt. %, or 3 wt. % to 5 wt. %, or 6 wt. % to 8 wt. %, without limitation.

Additives: In one or more instances, additional additives may be included in the LCM compositions of the present disclosure including, but not limited to, weighting agents, binders, and any combination thereof.

Methods of Preparing LCM Compositions and Properties Thereof

Embodiments of the present disclosure include methods of preparing the LCM compositions described herein. Specific preparations and additional details are provided below in the Example Section of the present disclosure.

Generally, as described above, the LCM compositions of the present disclosure comprise red mud, DAA, a silica source, an aqueous source, and optional additional additives (e.g., a calcium source).

In one or more embodiments, the LCM compositions comprising geopolymerization of the red mud based on the above-referenced components may include mixing the LCM components in a laboratory environment using a standard API blender for approximately 15 seconds (s) at 4,000 revolutions per minute (rpm), followed by 35 s at 12,000 rpm. The equation of mixing energy is shown below in Equation 1:

$$\frac{E}{M} = \frac{k\omega^2 t}{V} \quad \text{Equation 1}$$

where E is mixing energy measured in kiloJoules (kJ); M is mass of the LCM composition mixture measured in kilograms (kg); k is an experimentally-derived constant equivalent to 6.1e-8 $m^5/s$; ω is rotational speed measured in radians per second ($s^{-1}$); t is mixing time measured in seconds; and V is the volume of the LCM mixture composition measured in cubic meters ($m^3$).

In some instances, the DAA may be pre-mixed (e.g., overnight) prior to combining the remaining ingredients. Moreover, the LCM compositions may be pre-mixed prior to introduction into a subterranean formation wellbore or may be introduced as separate components "on-the-fly" at a wellsite or downhole, without departing from the scope of the present disclosure.

Thickening Time: As used herein, the term "thickening time," and grammatical variants thereof, refers to the time in which the LCM compositions described herein remain in a fluid state and are capable of being pumped into a lost circulation zone in a subterranean formation (e.g., using an LCM system according to the present disclosure comprising a pump fluidically coupled to a tubular extending into a wellbore within the subterranean formation, the pump capable of conveying the LCM via the tubular into the wellbore at a pressure sufficient to penetrate the lost circulation zone). Thickening time was determined herein using a pressurized consistometer, which allows pressure and temperature to be applied to the LCM compositions while they are being stirred (i.e., at 150 rpm) and includes a resistor arm on a potentiometer that indicates resistance. The consistometer is fully automated, may simulate squeeze schedules and/or batch mixing, and is calibrated to standard output in Bearden Consistency units.

The LCM compositions of the present disclosure exhibit a thickening time at 100° F. (~38° C.) in the range of about 1 hour to about 6 hours, incorporating any value and subrange in between, such as 1 hour to 2 hours, or 2 hours to 3 hours, or 3 hours to 4 hours, or 4 hours to 5 hours, or 5 hours to 6 hours, or 2 hours to 5 hours, or 1.5 hours to 6 hours, or 1.75 hours to 6 hours, or 2 hours to 6 hours, without limitation. In some cases, the thickening time may exceed 6 hours.

Setting Time: As used herein, the term “setting time,” and grammatical variants thereof, refers to the time in which the LCM compositions described herein begins to lose plasticity. The setting time of the LCM compositions of the present disclosure is 24 hours or more at a temperature of 180° F. (~82° C.).

Compressive Strength: As used herein, the term “compressive strength,” and grammatical variants thereof, refers to the maximum compressive axial stress the set LCM compositions of the present disclosure may withstand before crushing. The set LCM compositions of the present disclosure may exhibit a compressive strength after setting in the range of about 500 pounds per square inch (psi) or greater, encompassing any value and subrange in between, such as 600 psi or greater, or 700 psi or greater, or 800 psi or greater, or 900 psi or greater, or 1000 psi or greater. The set LCM compositions of the present disclosure may exhibit a compressive strength after setting in the range of about 500 psi to about 1000 psi, encompassing any value and subrange in between, such as 500 psi to 600 psi, or 600 psi to 700 psi, or 700 psi to 800 psi, or 800 psi to 900 psi, or 900 psi to 1000 psi, or 500 psi to 700 psi, or 600 psi to 800 psi, or 700 psi to 900 psi, or 800 psi to 1000 psi, or 500 psi to 750 psi or 750 psi to 1000 psi. In various embodiments, the set LCM compositions require heat curing (e.g., at 180° F. or greater) for at least 24 hours to develop the exhibited compressive strength. In various embodiments, the set LCM compositions do not require heat curing to develop the exhibited compressive strength.

Density: As used herein, the term “density,” and grammatical variants thereof, refers to the mass per unit volume of the LCM compositions described herein. The density of the LCM compositions of the present disclosure may be in the range of about 70 pounds per cubic square feet ($lb/ft^3$) to about 170 $lb/ft^3$, encompassing any value and subrange in between, such as 70 $lb/ft^3$ to 90 $lb/ft^3$, or 90 $lb/ft^3$ to 110 $lb/ft^3$, or 110 $lb/ft^3$ to 130 $lb/ft^3$, or 130 $lb/ft^3$ to 150 $lb/ft^3$, or 150 $lb/ft^3$ to 170 $lb/ft^3$, or 100 $lb/ft^3$ to 130 $lb/ft^3$, or 130 $lb/ft^3$ to 170 $lb/ft^3$, without limitation.

Viscosity: As used herein, the term “viscosity,” and grammatical variants thereof, refers to the property of the LCM compositions of the present disclosure that indicates their resistance to flow, defined as the ratio of shear stress to shear rate.

The viscosity of the LCM compositions may be measured using standard testing procedures and a standard oilfield viscometer, such as a FANN® Model 35 viscometer (Fann Instrument Company, Texas). Viscosity and may be determined according to API Recommended Practice entitled Field Testing Water-Based Drilling Fluids (RP 13B-1/ISO 10414-1:2002). The viscometer may report shear stress readings at shear rates of at least one of 600 RPM, 300 rpm, 200 rpm, 100 rpm, 6 rpm, and/or 3 rpm. These shear stress readings may be used to determine the viscosity of the LCM compositions of the present disclosure at any of the shear rates, using Equation 2, assuming a viscometer with an R1 rotor sleeve, B1 bob, and F1 torsion spring:

$$\mu = \frac{300}{N}\theta_N \quad \text{Equation 2}$$

where μ is viscosity expressed in centipoise (cP); N is shear rate (viscosity speed) measured in rpm; and $\theta_N$ is shear stress measured in units of pounds of force per 100 square feet (lbf/100 $ft^2$).

The viscosity of the LCM compositions of the present disclosure may be in the range of about 10 cP to about 150 cP, encompassing any value and subrange in between, such as 10 cP to 20 cP, or 20 cP to 30 cP, or 30 cP to 40 cP, or 40 cP to 50 cP, or 50 cP to 60 cP, or 60 cP to 70 cP, 70 cP to 80 cP, or 80 cP to 90 cP, or 90 cP to 100 cP, or 100 cP to 110 cP, or 110 cP to 120 cP, or 120 cP to 130 cP, or 130 cP to 140 cP, or 140 cP to 150 cP, or 20 cP to 150 cP, or 30 cP to 140 cP, or 40 cP to 130 cP, or 50 cP to 120 cP, or 60 cP to 110 cP, or 70 cP to 100 cP, or 80 cP to 90 cP, or 10 cP to 50 cP, or 50 cP to 100 cP, or 100 cP to 150 cP, or 25 cP to 50 cP, or 50 cP to 75 cP, or 75 cP to 100 cP, or 100 cP to 125 cP, or 125 cP to 150 cP.

Rheological Properties: The rheological properties useful in describing the LCM compositions of the present disclosure include, but are not limited to, plastic viscosity (PV) and yield point (YP), as modeled based on the Bingham plastic rheological model.

The rheological behavior of the LCM compositions described herein may be determined by measuring the shear stress on the LCM compositions at different shear rates, which may be accomplished by measuring the shear stress and/or shear rate a standard oilfield viscometer, such as a FANN® Model 35 viscometer operated at 3 rpm, 6 rpm, 100 rpm, 200 rpm, 300 rpm, and/or 600 rpm, for example. A Bingham plastic fluid may be modeled according to Equation 3, provided below:

$$\tau = (PV)\dot{\gamma} + 4.79(YP) \quad \text{Equation 3}$$

where τ is shear stress expressed in dynes per square centimeter ($dyne/cm^2$); PV is plastic viscosity measured in cP; $\dot{\gamma}$ is shear rate measured in $s^{-1}$; and YP is yield point measured in lbf/100 $ft^2$.

As used herein, the terms “plastic viscosity” or “PV,” and grammatical variants thereof, refers to the viscosity of the LCM compositions described herein when extrapolated to infinite shear rate using the Bingham plastic rheological model (see Equation 3 above); that is, the PV is the slope of shear stress v. shear rate based on the Bingham plastic rheological model. The PV is related to the resistance of the LCM compositions of the present disclosure to flow due to mechanical interaction between the solids therein and, thus, reflects the type and concentration of the solids in the LCM composition. The PV of the LCM compositions may be estimated by measuring the shear stress of the LCM compositions using a FANN® Model 35 viscometer at shear rates of 300 rpm and 600 rpm and subtracting the 300 rpm shear stress measurement from the 600 rpm shear stress measurement according to Equation 4, provided below:

$$PV = \theta_{600} - \theta_{300} \quad \text{Equation 4}$$

where PV is expressed in cP; $\theta_{600}$ is shear stress at 600 rpm (lbf/100 $ft^2$); and $\theta_{300}$ is shear stress at 300 rpm (lbf/100 $ft^2$).

Higher PV values indicate viscous LCM compositions due to excess solids, faster gelling, or the like, whereas a lower PV indicates a reduced viscosity due to lesser solids content, slower gelling, or the like. It is preferred that the LCM compositions of the present disclosure exhibit relatively low PV values to achieve desirable lost circulation functionality.

The LCM compositions of the present disclosure may have a PV value in the range of about 10 cP to about 100 cP, encompassing any value and subrange in between, such as 10 cP to 20 cP, or 20 cP to 30 cP, or 30 cP to 40 cP, or 40 cP to 50 cP, or 50 cP to 60 cP, or 60 cP to 70 cP, or 70 cP to 80 cP, or 80 cP to 90 cP, or 90 cP or 100 cP, or 20 cP to 40 cP, or 15 cP to 45 cP, or 10 cP to 50 cP, or 50 cP to 75 cP, or 60 cP to 80 cP, 75 cP to 100 cP, or 80 cP to 90 cP, or 50 cP to 100 cP, or without limitation. That is, the LCM compositions of the present disclosure may exhibit a desirable low PV, such as 10 cP to 50 cP, but not limited to, e.g., when the LCM compositions are pre-mixed prior to introduction into a subterranean formation wellbore or are introduced as separate components "on-the-fly" at a wellsite, or the LCM compositions may exhibit a desirable high PV, such as, but not limited to, 50 cP to 100 cP, e.g., when the LCM compositions are introduced as separate components "on-the-fly" downhole, without departing from the scope of the present disclosure.

As used herein, the terms "yield point" or "YP," and grammatical variants thereof, refers to the point at which the LCM compositions described herein can no longer deform elastically (i.e., no longer behaves as a rigid body, but as a viscous fluid), described as the value obtained from the Bingham-Plastic rheological model when extrapolated to a shear rate of zero. That is, the YP provides the amount of stress required to move the LCM compositions from a static condition and describes the attractive force among solids within the LCM composition. The YP of the LCM compositions of the present disclosure may be estimated by subtracting the PV (see Equation 4) from the shear stress of the LCM composition measured at 300 rpm according to Equation 5, provided below:

$$YP = \theta_{300} - PV \quad \text{Equation 5}$$

where YP is expressed in lbf/100 $ft^2$; $\theta_{300}$ is shear stress at 300 rpm (lbf/100 $ft^2$); and PV is expressed in cP. It is to be noted that 1 lbf/100 $ft^2$=4.79 dyne/$cm^2$.

The YP of the LCM compositions described herein is correlated with the capacity of the compositions to carry rock cuttings through the annulus during subterranean formation drilling operations, which in simplified terms indicates the LCM composition's hole-cleaning ability. Moreover, the determination of an LCM composition's YP is important in the overall description of its flow properties. Yield point affects both the start-up pressure after a temporary shut-down and the void filling properties of the LCM compositions during cementing operations, for example.

The LCM compositions of the present disclosure may have a YP value in the range of about 2 lbf/100 $ft^2$ to about 40 lbf/100 $ft^2$, encompassing any value and subrange in between, such as 2 lbf/100 $ft^2$ to 10 lbf/100 $ft^2$, or 10 lbf/100 $ft^2$ to 20 lbf/100 $ft^2$, or 20 lbf/100 $ft^2$ to 30 lbf/100 $ft^2$, or 30 lbf/100 $ft^2$ to 40 lbf/100 $ft^2$, or 4 lbf/100 $ft^2$ to 33 lbf/100 $ft^2$, or 4 lbf/100 $ft^2$ to 8 lbf/100 $ft^2$, or 8 lbf/100 $ft^2$ to 33 lbf/100 $ft^2$, without limitation.

Rheological evaluation further includes 10 second (10*s*) gel strength and 10 minute (10 min) gel strength of the LCM compositions (see Example Section below).

Accordingly, based on the above PV and YP values for the LCM compositions of the present disclosure exhibit desirable fluid flow behavior in which the LCM compositions behave as a rigid body under lesser shear stress but flow as a viscous fluid under greater shear stress.

Methods and Systems of Treating a Subterranean Formation

Embodiments of the present disclosure include methods of treating a "lost circulation zone" using the LCM compositions described herein. As used herein, the term "lost circulation zone," and grammatical variants thereof, refers to zones within a subterranean formation including depleted zones, low pressure zones, fractured zones, and any combination thereof. Lost circulation zones may comprise natural or induced fractures, fissures, or caverns, formations with high permeability and/or high porosity, vugular formations (vugs) (e.g., limestone and chalk), or the like. Such zones of interest may be treated with the LCM compositions of the present disclosure to reduce or prevent moderate to severe lost circulation.

The methods may include preparing an LCM composition in accordance with the present disclosure. The methods may include providing an LCM composition in accordance with the present disclosure; placing the LCM composition in a lost circulation zone in a subterranean formation; and allowing the LCM composition to set to form a geopolymer in the lost circulation zone so as to at least partially prevent lost circulation.

Placing the LCM composition in the lost circulation zone in the subterranean formation may include introducing the LCM composition into a wellbore in the subterranean formation. Placing the LCM composition in a wellbore may include using an LCM system in accordance with the present disclosure to pump the LCM composition into the wellbore via a tubular fluidically coupled to the pump, e.g., at a sufficient pressure for the LCM composition to penetrate a lost circulation zone of the subterranean formation. Allowing the LCM composition to set in the lost circulation zone may comprise heating the LCM composition in the lost circulation zone under formation temperature conditions, thereby polymerizing the LCM composition. As used herein, the term "formation temperature conditions," and grammatical variants thereof, refers to subterranean formation temperatures, which may be in the range of about 70° F. (~21° C.) to about 290° F. (~143° C.), encompassing any value and subrange in between, such as 70° F. to 120° F., or 120° F. to 170° F., or 170° F. to 220° F., or 220° F. to 290° F., or 70° F. to 180° F.

The methods of the present disclosure may be used in many different types of subterranean treatment operations. Such operations include, but are not limited to, drilling operations, lost circulation operations, stimulation operations, sand control operations, completion operations, acidizing operations, scale inhibiting operations, water-blocking operations, clay stabilizer operations, fracturing operations, frac-packing operations, gravel packing operations, wellbore strengthening operations, sag control operations, and any combination thereof.

Moreover, the subterranean formation treated with the LCM compositions of the present disclosure may be of any orientation, including substantially horizontal, vertical, or deviated, and may be cased or un-cased, without departing from the scope of the present disclosure.

In various embodiments, systems configured for delivering the LCM compositions described herein to a subterranean formation through a wellbore formed therein, downhole location are described. In various embodiments, the systems may comprise a tubular extending into a wellbore in a subterranean formation; and a pump fluidly coupled to the tubular, wherein the pump is capable of conveying an LCM composition according to the present disclosure into the wellbore via the tubular at a pressure sufficient for the LCM composition to penetrate a lost circulation zone of the subterranean formation. It will be appreciated that while the system described below may be used for delivering LCM compositions described herein, one or more portions of the compositions may be delivered separately into the subterranean formation The pump may be a high-pressure pump in some embodiments. As used herein, the term "high pressure pump" will refer to a pump that is capable of delivering the LCM compositions downhole at a pressure of about 1000 psi or greater. A high-pressure pump may be used when it is desired to introduce the LCM compositions to a subterranean formation at or above a fracture gradient of the subterranean formation, but it may also be used in cases where fracturing is not desired. Suitable high-pressure pumps will be known to one having ordinary skill in the art and may include, but are not limited to, floating piston pumps and positive displacement pumps.

In other embodiments, the pump may be a low-pressure pump. As used herein, the term "low pressure pump" will refer to a pump that operates at a pressure of about 1000 psi or less. In some embodiments, a low-pressure pump may be fluidly coupled to a high-pressure pump that is fluidly coupled to the tubular. That is, in such embodiments, the low-pressure pump may be configured to convey the fluids to the high-pressure pump. In such embodiments, the low-pressure pump may "step up" the pressure of the LCM compositions before reaching the high-pressure pump.

In some embodiments, the systems described herein may further comprise a mixing tank that is upstream of the pump and in which the LCM compositions are formulated. In various embodiments, the pump (e.g., a low-pressure pump, a high-pressure pump, or a combination thereof) may convey the LCM compositions from the mixing tank or other source of the LCM compositions to the tubular. In other embodiments, however, the LCM compositions may be formulated offsite (i.e., pre-mixed) and transported to a worksite, in which case the LCM compositions may be introduced to the tubular via the pump directly from its shipping container (e.g., a truck, a railcar, a barge, or the like) or from a transport pipeline. In either case, the LCM compositions may be drawn into the pump, elevated to an appropriate pressure, and then introduced into the tubular for delivery downhole.

FIG. 1 shows an illustrative schematic of a system that may deliver the LCM compositions of the present disclosure to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which the LCM compositions of the embodiments herein may be formulated (or otherwise may be pre-mixed in a laboratory or pre-mixed at the wellsite as described with reference to FIG. 1). The LCM compositions may be conveyed via line 12 to wellhead 14, where the LCM compositions enter tubular 16, tubular 16 extending from wellhead 14 into subterranean formation 18. Upon being ejected from tubular 16, the LCM compositions may subsequently penetrate into subterranean formation 18. Pump 20 may be configured to raise the pressure of the LCM compositions to a desired degree (e.g., a pressure sufficient for the LCM compositions to penetrate into lost circulation zones in the subterranean formation 18) before introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

It is also to be recognized that the disclosed LCM compositions may also directly or indirectly affect the various downhole equipment and tools that may come into contact with the LCM compositions during a subterranean formation operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

Embodiment A. A method comprising: providing a lost circulation material (LCM) composition comprising: a red mud; a silica source; a developed alkaline activator (DAA); and an aqueous source; placing the LCM composition in a lost circulation zone in a subterranean formation; and allowing the LCM composition to set to form a geopolymer in the lost circulation zone so as to at least partially prevent lost circulation.

Embodiment B. A lost circulation material (LCM) comprising: a red mud; a silica source; a developed alkaline activator (DAA) comprising sodium hydroxide and sodium silicate; and an aqueous source.

Embodiment C. A system comprising: a tubular extending into a wellbore in a subterranean formation; and a pump fluidly coupled to the tubular, wherein the pump is capable of conveying a lost circulation material (LCM) composition into the wellbore via the tubular at a pressure sufficient for the LCM composition to penetrate a lost circulation zone of the subterranean formation, the LCM composition comprising: a red mud; a silica source; a developed alkaline activator (DAA); and an aqueous source.

Each of Embodiments A, B, and C may have one or more of the following additional elements in any combination:

Element 1: wherein the red mud comprises a sodium content in an amount in the range of 20 wt. % to 40 wt. % based on total weight of the red mud.

Element 2: wherein the red mud is present in the LCM composition in an amount in the range of about 50 wt. % to about 70 wt. % based on total solids in the LCM composition.

Element 3: wherein the silica source comprises a silica source selected from the group consisting of silica fume, Portland cement, and any combination thereof.

Element 4: wherein the silica source is present in the LCM composition in an amount in the range of about 0.1 wt. % to about 50 wt. % based on total weight of the red mud.

Element 5: wherein the DAA comprises sodium silicate and sodium hydroxide at a molar ratio of about 1.5:1 to about 2.5:1.

Element 6: wherein the LCM composition comprises silicon dioxide and aluminum oxide in a molar ratio of about 2 to about 4.

Element 7: wherein the LCM composition comprises the DAA and aluminum oxide in a molar ratio of about 0.4 to about 1.

Element 8: wherein the aqueous source comprises an aqueous source selected from the group consisting of deionized water, tap water, fresh water, salt water, natural brine, synthetic brine, municipal water, formation water, produced water, well water, filtered water, distilled water, sea water, purified contaminated water, and any combination thereof.

Element 9: wherein the aqueous source is present in the LCM composition in an amount in the range of about 10 wt. % to about 70 wt. % based on total weight of the red mud.

Element 10: wherein the LCM composition further comprises a calcium source.

Element 11: wherein the calcium source is present in the LCM composition in an amount in the range of about 2 wt. % to about 8 wt. % based on total weight of the red mud; and/or wherein the calcium source is lime.

Element 12: wherein the LCM composition has a density in the range of about 70 $lb/ft^3$ to about 170 $lb/ft^3$.

Element 13: wherein the LCM composition has a viscosity in the range of about 10 cP to about 150 cP.

Element 14: wherein the LCM composition has a plastic viscosity in the range of about 10 cP to about 50 cP and a yield point in the range of about 2 $lbf/100\ ft^2$ to about 40 $lbf/100\ ft^2$.

Element 15: wherein the LCM composition has a thickening time at a temperature of about 100° F. of about 1 hour to about 6 hours and a setting time at a temperature of about 180° F. of equal to or greater than about 24 hours.

Element 16: wherein, after setting the LCM composition at a temperature of about 180° F. and a time of about 24 hours, the geopolymer has a compressive strength in the range of about 500 psi to about 700 psi.

Element 17: wherein the formation temperature conditions are in the range of 70° F. to 290° F.

By way of non-limiting example, exemplary combinations of Elements 1-17 applicable to Embodiments A, B and C may include: 1&2; 1&3; 1&4; 1&5; 1&6; 1&7; 1&8; 1&9; 1&10; 1&11; 1&12; 1&13; 1&14; 1&15; 1&16; 1&17; 2&3; 2&4; 2&5; 2&6; 2&7; 2&8; 2&9; 2&10; 2&11; 2&12; 2&13; 2&14; 2&15; 2&16; 2&17; 3&4; 3&5; 3&6; 3&7; 3&8; 3&9; 3&10; 3&11; 3&12; 3&14; 3&15; 3&16; 3&17; 4&5; 4&6; 4&7; 4&8; 4&9; 4&10; 4&11; 4&12; 4&13; 4&14; 4&15; 4&16; 4&17; 5&6; 5&7; 5&8; 5&9; 5&10; 5&11; 5&12; 5&13; 5&14; 5&15; 5&16; 5&17; 6&7; 6&8; 6&9; 6&10; 6&11; 6&12; 6&13; 6&14; 6&15; 6&16; 6&17; 7&8; 7&9; 7&10; 7&11; 7&12; 7&13; 7&14; 7&15; 7&16; 7&17; 8&9; 8&10; 8&11; 8&12; 8&13; 8&14; 8&15; 8&16; 8&17; 9&10; 9&11; 9&12; 9&13; 9&14; 9&15; 9&16; 9&17; 10&11; 10&12; 10&13; 10&14; 10&15; 10&16; 10&17; 11&12; 11&13; 11&14; 11&15; 11&16; 11&17; 12&13; 12&14; 12&15; 12&16; 12&17; 13&14; 13&15; 13&16; 13&17; 14&15; 14&16; 14&17; 15&16; 15&17; 16&17; 1-3; 1-4; 1-5; 1-6; 1-7; 1-8; 1-9; 1-10; 1-11; 1-12; 1-13; 1-14; 1-15; 1-16; 1-17; 2-4; 2-5; 2-6; 2-7; 2-8; 2-9; 2-10; 2-11; 2-12; 2-13; 2-14; 2-15; 2-15; 2-16; 2-17; 3-5; 3-6; 3-7; 3-8; 3-9; 3-10; 3-11; 3-12; 3-13; 3-14; 3-15; 3-16; 3-17; 4-6; 4-7; 4-8; 4-9; 4-10; 4-11; 4-12; 4-13; 4-14; 4-15; 4-16; 4-17; 5-7; 5-8; 5-9; 5-10; 5-11; 5-12; 5-13; 5-14; 5-15; 5-16; 5-17; 6-8; 6-9; 6-10; 6-11; 6-12; 6-13; 6-14; 6-15; 6-16; 6-17; 7-9; 7-10; 7-11; 7-12; 7-13; 7-14; 7-15; 7-16; 7-17; 8-10; 8-11; 8-12; 8-13; 8-14; 8-15; 8-16; 8-17; 9-11; 9-12; 9-13; 9-14; 9-15; 9-16; 9-17; 10-12; 10-13; 10-14; 10-15; 10-16; 10-17; 11-13; 11-14; 11-15; 11-16; 11-17; 12-14; 12-15; 12-16; 12-17; 13-15; 13-16; 13-17; 14-16; 14-17; and 15-17.

The present disclosure is further directed to the following non-limiting embodiments.

Embodiment 1. A method comprising: providing a lost circulation material (LCM) composition comprising: a red mud; a silica source; a developed alkaline activator (DAA); and an aqueous source; placing the LCM composition in a lost circulation zone in a subterranean formation; and allowing the LCM composition to set to form a geopolymer in the lost circulation zone so as to at least partially prevent lost circulation.

Embodiment 2. The method of Embodiment 1, wherein the red mud comprises a sodium content in an amount in the range of X wt. % to Y wt. % based on total weight of the red mud.

Embodiment 3. The method of Embodiment 1 or Embodiment 2, wherein the red mud is present in the LCM composition in an amount in the range of about 50 wt. % to 70 wt. % based on total solids in the LCM composition.

Embodiment 4. The method of any one of Embodiments 1-3, wherein the silica source comprises a silica source selected from the group consisting of silica fume, Portland cement, and any combination thereof.

Embodiment 5. The method of any one of Embodiments 1-4, wherein the silica source is present in the LCM composition in an amount in the range of about 0.1 wt. % to about 50 wt. % based on total weight of the red mud.

Embodiment 6. The method of any one of Embodiments 1-5, wherein the DAA comprises sodium silicate and sodium hydroxide at a molar ratio of about 1.5:1 to about 2.5:1.

Embodiment 7. The method of any one of Embodiments 1-6, wherein the LCM composition comprises silicon dioxide and aluminum oxide in a molar ratio of about 2 to about 4.

Embodiment 8. The method of any one of Embodiments 1-7, wherein the LCM composition comprises the DAA and aluminum oxide in a molar ratio of about 0.4 to about 1.

Embodiment 9. The method of any one of Embodiments 1-8, wherein the aqueous source comprises an aqueous source selected from the group consisting of deionized water, tap water, fresh water, salt water, natural brine, synthetic brine, municipal water, formation water, produced water, well water, filtered water, distilled water, sea water, purified contaminated water, and any combination thereof.

Embodiment 10. The method of any one of Embodiments 1-9, wherein the aqueous source is present in the LCM composition in an amount in the range of about 10 wt. % to about 70 wt. % based on total weight of the red mud.

Embodiment 11. The method of any one of Embodiments 1-10, wherein the LCM composition further comprises a calcium source.

Embodiment 12. The method of Embodiments 11, wherein the calcium source is present in the LCM composition in an amount in the range of about 2 wt. % to about 8 wt. % based on total weight of the red mud; and/or wherein the calcium source is lime.

Embodiment 13. The method of any one of Embodiments 1-12, wherein the LCM composition has a density in the range of about 70 $lb/ft^3$ to about 170 $lb/ft^3$.

Embodiment 14. The method of any one of Embodiments 1-13, wherein the LCM composition has a viscosity in the range of about 10 cP to about 150 cP.

Embodiment 15. The method of any one of Embodiments 1-14, wherein the LCM composition has a plastic viscosity in the range of about 10 cP to about 50 cP and a yield point in the range of about 2 lbf/100 $ft^2$ to about 40 lbf/100 $ft^2$.

Embodiment 16. The method of any one of Embodiments 1-15, wherein the LCM composition has a thickening time at a temperature of about 100° F. of about 1 hour to about 6 hours and a setting time at a temperature of about 180° F. of equal to or greater than about 24 hours.

Embodiment 17. The method of any one of Embodiments 1-16, wherein, after setting the LCM composition at a temperature of about 180° F. and a time of about 24 hours, the geopolymer has a compressive strength in the range of about 500 psi to about 700 psi.

Embodiment 18. The method of any one of Embodiments 1-17, wherein the formation temperature conditions are in the range of 70° F. to 290° F.

Embodiment 19. A lost circulation material (LCM) comprising: a red mud; a silica source; a developed alkaline activator (DAA) comprising sodium hydroxide and sodium silicate; and an aqueous source.

Embodiment 20. A system comprising: a tubular extending into a wellbore in a subterranean formation; and a pump fluidly coupled to the tubular, wherein the pump is capable of conveying a lost circulation material (LCM) composition into the wellbore via the tubular at a pressure sufficient for the LCM composition to penetrate a lost circulation zone of the subterranean formation, the LCM composition comprising: a red mud comprising aluminum oxide and silicon dioxide; a silica source; a developed alkaline activator (DAA); and an aqueous source.

To facilitate a better understanding of the embodiments of the present disclosure, the following example of a preferred or representative embodiment is given. In no way should the following example be read to limit, or to define, the scope of the present disclosure.

Examples

Various LCM compositions were prepared as described above and according to the following Formulations. While further investigation of all of the Formulations is not described herein, the following Formulations 1-4 are representative Formulations for preparing the LCM compositions in accordance with the present disclosure. Formulations 1-4 are provided below in Table 1. The red mud component, silica fume (i.e., silica source as part of the DAA) component, and optional lime (i.e., a calcium oxide (CaO) source) component are provided in grams (g); and the sodium silicate (forming part of the DAA) component, the sodium hydroxide (forming part of the DAA) component, and the aqueous source component (distilled water) are provided in milliliters (ml):

TABLE 1

| LCM Component | Formulation 1 | Formulation 2 | Formulation 3 | Formulation 4 |
|---|---|---|---|---|
| Red Mud | 300 g | 300 g | 300 g | 300 g |
| Sodium Silicate | 130 ml | 130 ml | 130 ml | 130 ml |
| Sodium Hydroxide | 82 ml | 82 ml | 82 ml | 82 ml |
| Aqueous Source | 140 ml | 140 ml | 140 ml | 140 ml |
| Silica Source | 90 g | 150 g | 90 g | 90 g |
| CaO Source | — | — | 10 g (3.3%) | 20 g (6.6%) |

Example 1: Before evaluating the various Formulations provided above, chemical and elemental analysis was performed on the red mud making up Formulations 1-4. The analysis was performed using Wavelength Dispersive X-ray Fluorescence (WDXRF). WDXRF is achieved using WDXRF spectrometer instrumentation, in which all elements of a sample are excited simultaneously. The different characteristic radiation energies are emitted from the red mud sample and diffracted in different directions by an analyzing crystal or monochrometer (like the action of a prism dispersing different colors of visible light in different directions). By placing the detector at a certain angle, the intensity of X-rays with particular wavelengths may be measured. Sequential spectrometers use a moving detector on a goniometer to move it through an angular range to measure the intensities of many different wavelengths. Simultaneous spectrometers are equipped with a set of fixed detection systems, where each system measures the radiation of a specific element.

In this Example, a sample red mud was homogenized and manually grounded using an agate mortar and a pestle for several minutes to achieve fine particle size. Thereafter, 4 g of the ground red mud was mixed well and homogenized with 0.9 grams of a binder. The binder used was LICOWAX® C Micropowder PM (available from Hoechst AG, Germany). The powder was then pressed with 20 tons of pressure to a pellet having a 31-millimeter (mm) diameter. WDXRF analysis was performed on the sample using the standardless OMNIA™ 27 method. The results of the red mud WDXRF analysis for primary chemical oxides within the red mud is shown in Table 2 below:

TABLE 2

| Chemical Oxide | Percentage (wt. %) |
|---|---|
| Iron Oxide ($Fe_2O_3$) | 30.74 |
| Aluminum Oxide ($Al_2O_3$) | 25.645 |
| Silicone Oxide ($SiO_2$) | 15.178 |
| Calcium Oxide (CaO) | 5.59 |
| Magnesium Oxide (MgO) | 0.17 |
| Potassium Oxide ($K_2O$) | 0.036 |

The results of the red mud WDXRF analysis for elements in the red mud is shown Table 3 using 10 duplicate samples (S1-S10) prepared as described above; an average of each element is additionally provided in Table 3. Each of the elemental composition of 51-S10 is reported in wt. %.

TABLE 3

| Element | S1 | S2 | S3 | S4 | S5 | S6 |
|---|---|---|---|---|---|---|
| O | 33.900 | 33.800 | 33.700 | 33.900 | 33.900 | 33.800 |
| Na | 33.300 | 33.500 | 33.600 | 33.800 | 33.870 | 33.740 |
| Fe | 11.900 | 11.800 | 11.300 | 11.470 | 11.340 | 11.530 |
| Al | 6.600 | 6.700 | 3.800 | 6.740 | 6.830 | 6.720 |
| Si | 3.800 | 3.800 | 3.900 | 3.890 | 3.920 | 3.915 |
| Ca | 3.100 | 3.100 | 3.000 | 3.037 | 3.010 | 3.053 |
| Ti | 3.000 | 3.000 | 3.000 | 2.990 | 2.970 | 2.972 |
| S | 2.100 | 2.000 | 2.100 | 2.090 | 2.100 | 2.124 |
| F | 0.800 | 0.800 | 1.000 | 0.980 | 0.960 | 1.100 |
| Cl | 0.300 | 0.400 | 0.400 | 0.403 | 0.370 | 0.390 |
| Sr | 0.100 | 0.100 | 0.142 | 0.140 | 0.139 | 0.140 |
| Zr | 0.100 | 0.100 | 0.135 | 0.132 | 0.130 | 0.130 |
| P | 0.090 | 0.090 | 0.097 | 0.092 | 0.095 | 0.090 |
| Mg | 0.070 | 0.080 | 0.074 | 0.068 | 0.070 | 0.072 |
| Cr | 0.060 | 0.050 | 0.058 | 0.057 | 0.060 | 0.060 |

| Element | S7 | S8 | S9 | S10 | Average of S1-S10 |
|---|---|---|---|---|---|
| O | 33.800 | 33.960 | 33.900 | 33.900 | 33.856 |
| Na | 33.670 | 33.800 | 33.500 | 33.500 | 33.628 |
| Fe | 11.600 | 11.440 | 11.600 | 11.620 | 11.560 |
| Al | 6.750 | 6.720 | 6.729 | 6.850 | 6.744 |
| Si | 3.906 | 3.890 | 3.913 | 3.932 | 3.887 |
| Ca | 3.080 | 3.060 | 3.104 | 3.036 | 3.058 |
| Ti | 2.980 | 3.020 | 2.984 | 3.024 | 2.994 |
| S | 2.080 | 2.087 | 2.167 | 2.094 | 2.094 |
| F | 0.954 | 0.944 | 0.963 | 0.917 | 0.942 |
| Cl | 0.396 | 0.385 | 0.411 | 0.424 | 0.388 |
| Sr | 0.142 | 0.142 | 0.142 | 0.142 | 0.133 |
| Zr | 0.132 | 0.132 | 0.131 | 0.131 | 0.125 |
| P | 0.097 | 0.096 | 0.100 | 0.096 | 0.094 |
| Mg | 0.070 | 0.077 | 0.073 | 0.073 | 0.073 |
| Cr | 0.058 | 0.057 | 0.058 | 0.057 | 0.058 |

The results shown in Table 2 and Table 3 indicate that the red mud samples have relatively large amounts of sodium content.

Figure 2:
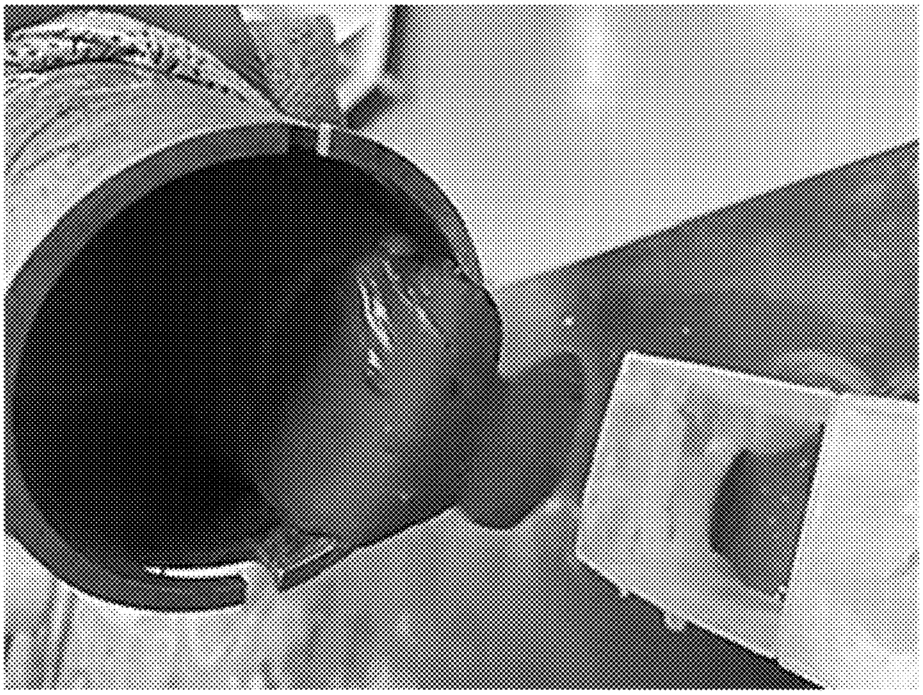
FIG. 2 is a photograph visually depicting the gelling of an LCM composing according to one or more embodiments of the present disclosure.
Figure 3:
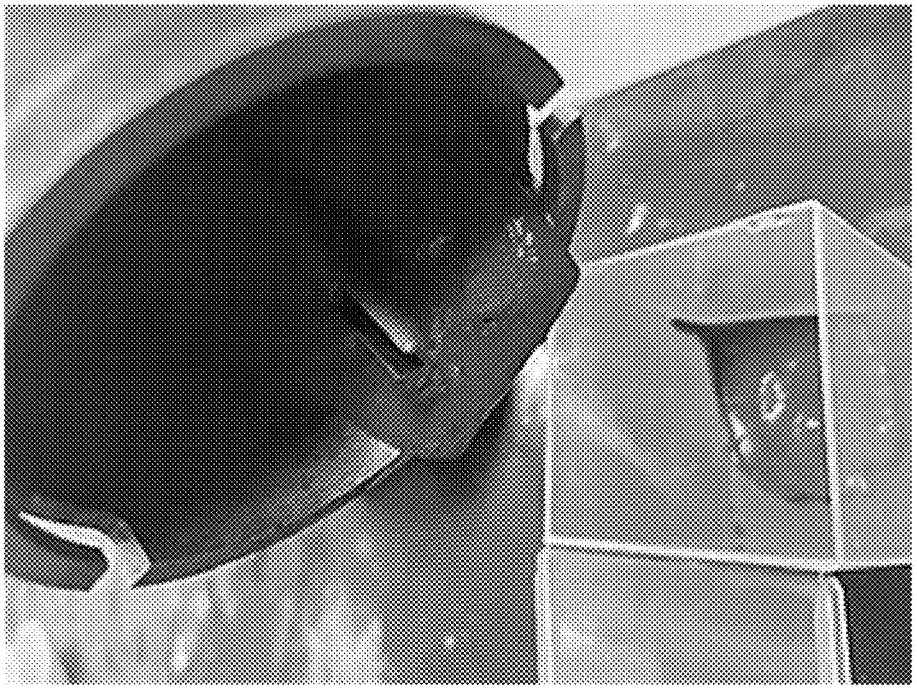
FIG. 3 is a photograph visually depicting the gelling of an LCM composing according to one or more embodiments of the present disclosure.

Example 2: In this Example, Formulation 3 and Formulation 4 were prepared as described herein above in a laboratory environment. Both Formulations were conditioned for 1 hour at 180° F. (~82° C.) and demonstrated strong gelling in the presence of lime (at both 3.3% and 6.6% by visual observation. The visual observation of gelling of Formula 3 is shown in FIG. 2 and the visual observation of gelling of Formula 4 is shown in FIG. 3.

Example 3: In this Example, the rheological properties and thickening time of Formulation 1 were evaluated according to the methods described herein above.

The rheology evaluation was performed at room temperature (RT). Further, free fluid filtrate after 2 hours was evaluated. The rheology results are shown in Table 4 below, including the PV and YP.

TABLE 4

| Rheology | Formulation 1 at RT |
|---|---|
| 600 rpm | 42 |
| 300 rpm | 25 |
| 200 rpm | 16-18 |
| 100 rpm | 11 |
| 6 rpm | 2 |
| 3 rpm | 2 |
| PV | 17 cP |
| YP | 8 lb/100 $ft^2$ |
| 10 s gel strength | 5 lb/100 $ft^2$ |
| 10 min gel strength | 9 lb/100 $ft^2$ |
| Free Fluid Filtrate | 0 ml |

Formulation 1 demonstrated a thickening time at RT of approximately 6 hours.

As shown in Table 4, the LCM composition of Formulation 1, having no lime, and evaluated at RT, illustrates desirable rheological properties and thickening time for lost circulation control.

Example 4: In this Example, the rheological properties of Formulation 1 at 180° F. after 1 hour were evaluated according to the methods described herein above.

The rheology results are shown in Table 5 below, including the PV and YP.

TABLE 5

| Rheology | Formulation 1 at 180° F. for 1 hour |
|---|---|
| 600 rpm | 63 |
| 300 rpm | 48 |
| 200 rpm | 42 |
| 100 rpm | 36 |
| 6 rpm | 22 |
| 3 rpm | 14 |
| PV | 15 cP |
| YP | 33 lb/100 $ft^2$ |
| 10 s gel strength | 15 lb/100 $ft^2$ |
| 10 min gel strength | 25 lb/100 $ft^2$ |
| Free Fluid Filtrate | 0 ml |

As shown in Table 5, the LCM composition of Formulation 1, having no lime, and evaluated after 1 hour at 180° F., illustrates desirable rheological properties.

Example 5: In this Example, the rheological properties and thickening time of Formulation 2 were evaluated according to the methods described herein above.

The rheology evaluation was performed at RT. Further, free fluid filtrate after 2 hours was evaluated. The rheology results are shown in Table 6 below, including the PV and YP.

TABLE 6

| Rheology | Formulation 2 at RT |
|---|---|
| 600 rpm | 88 |
| 300 rpm | 46 |
| 200 rpm | 32 |
| 100 rpm | 21 |
| 6 rpm | 4 |
| 3 rpm | 3 |
| PV | 42 cP |
| YP | 4 lb/100 $ft^2$ |
| 10 s gel strength | 4 lb/100 $ft^2$ |
| 10 min gel strength | 12 lb/100 $ft^2$ |
| Free Fluid Filtrate | 0 ml |

Formula 2 demonstrated a thickening time at RT of approximately 4-6 hours.

As shown in Table 6, the LCM composition of Formulation 2, having no lime, and evaluated at RT, illustrates desirable rheological properties and thickening time for lost circulation control. Moreover, it is noteworthy that the higher silica source content (50% v. 30% for Formula 1 in Example 3) increased thickening time.

Example 6: Formulas 1 and 2 were evaluated for compressive strength using a crushing test (i.e., after curing at 180° F. for 24 hours, then cooling for 2 days). Formula 1 demonstrated a compressive strength of about 500 psi, while Formula 2, having the higher silica source content (50% v. 30% for Formula 1) demonstrated a compressive strength of approximately 650-700 psi. Thus, Formula 2 illustrated a desirable and fast development of compressive strength for lost circulation control. However, for Formula 1, compressive strength development was slower, and more heat was required to achieve a fast-developing acceptable compressive strength. Cement or other geopolymerization accelerators such as calcium chloride ($CaCl_2$) may be added in low amounts to LCM compositions to produce a fast-developing, acceptable compressive strength without heat curing.

Accordingly, the LCM compositions of the present disclosure are adequate for mitigating or preventing lost circulation during the performance of a subterranean formation operation using a red mud-derived geopolymer.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes may be made, and equivalents may be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A method comprising:

providing a lost circulation material (LCM) composition comprising:

a red mud;

a silica source comprising silicon dioxide ($SiO_2$);

a developed alkaline activator (DAA), wherein the DAA comprises a sodium silicate ($(SiO_2)_n$:$Na_2O$) and sodium hydroxide (NaOH); and an aqueous source;

wherein the red mud comprises a sodium content in an amount in the range of about 20 wt. % to about 40 wt. % based on total weight of the red mud;

placing the LCM composition in a lost circulation zone in a subterranean formation; and allowing the LCM composition to set to form a geopolymer in the lost circulation zone so as to at least partially prevent lost circulation.

2. The method of claim 1, wherein the red mud is present in the LCM composition in an amount in the range of about 50 wt. % to about 70 wt. % based on total solids in the LCM composition.

3. The method of claim 1, wherein the silica source further comprises silica fume, Portland cement, or any combination thereof.

4. The method of claim 1, wherein the silica source is present in the LCM composition in an amount in the range of about 0.1 wt. % to about 50 wt. % based on total weight of the red mud.

5. The method of claim 1, wherein the DAA comprises sodium silicate and sodium hydroxide at a molar ratio of about 1.5:1 to about 2.5:1.

6. The method of claim 1, wherein the LCM composition comprises silicon dioxide and aluminum oxide in a molar ratio of about 2 to about 4.

7. The method of claim 1, wherein the LCM composition comprises the DAA and aluminum oxide in a molar ratio of about 0.4 to about 1.

8. The method of claim 1, wherein the aqueous source comprises an aqueous source selected from the group consisting of deionized water, tap water, fresh water, salt water, natural brine, synthetic brine, municipal water, formation water, produced water, well water, filtered water, distilled water, sea water, purified contaminated water, and any combination thereof.

9. The method of claim 1, wherein the aqueous source is present in the LCM composition in an amount in the range of about 10 wt. % to about 70 wt. % based on total weight of the red mud.

10. The method of claim 1, wherein the LCM composition further comprises a calcium source; wherein the calcium source is present in the LCM composition in an amount in the range of about 2 wt. % to about 8 wt. % based on total weight of the red mud; and wherein the calcium source is lime.

11. The method of claim 1, wherein the LCM composition has a density in the range of about 70 $lb/ft^3$ to about 170 $lb/ft^3$.

12. The method of claim 1, wherein the LCM composition has a viscosity in the range of about 10 cP to about 150 cP.

13. The method of claim 1, wherein the LCM composition has a plastic viscosity in the range of about 10 cP to about 50 cP and a yield point in the range of about 2 lbf/100 $ft^2$ to about 40 lbf/100 $ft^2$.

14. The method of claim 1, wherein the LCM composition has a thickening time at a temperature of about 100° F. of about 1 hour to about 6 hours and a setting time at a temperature of about 180° F. of equal to or greater than about 24 hours.

15. The method of claim 1, wherein, after setting the LCM composition at a temperature of about 180° F. and a time of about 24 hours, the geopolymer has a compressive strength in the range of about 500 psi to about 700 psi.

16. The method of claim 1, wherein the formation temperature conditions are in the range of 70° F. to 290° F.

17. A system comprising:

a tubular extending into a wellbore in a subterranean formation; and a pump fluidly coupled to the tubular, wherein the pump is configured to convey a lost circulation material (LCM) composition into the wellbore via the tubular at a pressure sufficient for the LCM composition to penetrate a lost circulation zone of the subterranean formation, the LCM composition comprising:

a red mud;

a silica source comprising silicon dioxide ($SiO_2$);

a developed alkaline activator (DAA), wherein the DAA comprises a sodium silicate ($(SiO_2)_n$:$Na_2O$) and sodium hydroxide (NaOH); and an aqueous source; and wherein the red mud comprises a sodium content in an amount in the range of about 20 wt. % to about 40 wt. % based on total weight of the red mud.

* * * * *